(12) United States Patent
Darr

(10) Patent No.: US 6,658,055 B1
(45) Date of Patent: Dec. 2, 2003

(54) METHOD FOR ACCELERATING THE TRAINING OF ADAPTIVE ECHO CANCELERS IN THE PRESENCE OF INTERFERING SINUSOIDAL SIGNALS

(75) Inventor: Roger R. Darr, Bethlehem, GA (US)

(73) Assignee: Arris International, Inc., Duluth, GA (US)

( * ) Notice: Subject to any disclaimer, the term of this patent is extended or adjusted under 35 U.S.C. 154(b) by 569 days.

(21) Appl. No.: 09/615,309

(22) Filed: Jul. 13, 2000

Related U.S. Application Data

(60) Provisional application No. 60/144,392, filed on Jul. 16, 1999.

(51) Int. Cl.[7] .......................... H03H 7/30; G06F 17/10; H04M 9/08
(52) U.S. Cl. ................... 375/232; 708/322; 379/406.08
(58) Field of Search .......................... 375/232, 229, 375/231, 350, 345; 708/322, 323; 333/28 R; 379/406.08, 406.05, 406.01

(56) References Cited

U.S. PATENT DOCUMENTS

| | | | | |
|---|---|---|---|---|
| 5,428,562 A | * | 6/1995 | Gay | 708/322 |
| 5,483,594 A | * | 1/1996 | Prado et al. | 379/406.08 |
| 5,592,548 A | * | 1/1997 | Sih | 379/406.08 |

* cited by examiner

*Primary Examiner*—Khai Tran

(57) ABSTRACT

A system and method for canceling both an echo signal and a spurious sinusoidal signal, such as a telephone dialtone or a carrier signal, from a return signal in a communications system involves producing a replica of the echo signal using an adaptive filter and producing a replica of the sinusoidal signal using an oscillator circuit. The replicas are subtracted from the return signal. The magnitude and phase of the sinusoidal signal are determined by generating a signal that is close in frequency to the expected frequency of the sinusoid and then correlating it to the return signal. The correlation produces a replica of the sinusoid.

12 Claims, 3 Drawing Sheets

METHOD FOR ACCELERATING THE TRAINING OF ADAPTIVE ECHO CANCELERS IN THE PRESENCE OF INTERFERING SINUSOIDAL SIGNALS

CROSS REFERENCE TO RELATED APPLICATION

The benefit of the filing date of U.S. Provisional Patent Application, Ser. No. 60/144,392, filed Jul. 16, 1999, is hereby claimed, and the specification thereof is incorporated herein in its entirety by this reference.

BACKGROUND OF THE INVENTION

1. Field of the Invention

This invention relates generally to improving voice or data communication channel quality and, more specifically, to adaptive echo cancelers.

2. Description of the Related Art

Communication channel echo is a reflective signal that can impair voice and data communication. Echo occurs when an undesirably reflected communication signal returns to the source after a delay. The impairment can range from mild to severe, depending upon signal energy and delay. At worst case, an echo signal may have enough energy or delay to render conversation unintelligible in analog voice communication networks and corrupt data in digital communication networks. Communication networks commonly include circuits known as hybrids that interface 2-wire network links to 4-wire network links. Typically, 2-wire links are used for voice communication, and 4-wire links are used for data communication. Hybrids are the primary sources of signal reflection in telecommunications networks.

Echo suppressors are circuits that operate in half-duplex communication channels by attenuating the return path signal. A major disadvantage of echo suppressors is that they operate only in half-duplex channels. That is, they cannot suppress echoes where two sources, such as parties to a conversation, communicate with each other simultaneously on the same channel. Echo suppressors therefore have been largely supplanted by echo cancelers. Echo cancellation overcomes the problems of echo suppression by employing adaptive filter algorithms that perform system identification with the communication impulse response over time. In essence, an echo canceler models the hybrid or other reflective medium and subtracts a replica of the echo from the return signal. The adaptive filter algorithm that models the reflective medium adjusts filter coefficients until the filter converges, i.e., accurately models the medium, in response to feedback. The convergence process is commonly referred to as training the filter.

Spurious signals in the communication channel may hamper the operation of echo cancelers. A telephone dialtone is an example of such a signal. A dialtone is composed of two sinusoids, one having a frequency of 350 Hz and the other having a frequency of 440 Hz. Most echo cancelers cannot operate properly when a dialtone is present. It has been suggested that if an echo canceler were forced to train in the presence of high-amplitude interfering sinusoidal signals, it should operate with a greatly reduced adaptation step size in order to reduce the effect of the non-correlated interfering signals upon the accuracy of the filter coefficients. Operating in this manner would slow filter convergence. The higher the amplitude of the interfering signal relative to the correlated echo, i.e., the training signal, the slower the filter converges for a given accuracy.

It would be desirable to provide an adaptive echo canceler that can be trained in the presence of sinusoidal signals such as a dialtone without sacrificing performance. The present invention addresses these problems in the manner described below.

SUMMARY OF THE INVENTION

The present invention relates to a system and method for canceling both an echo signal and a spurious sinusoidal signal, such as a telephone dialtone or a carrier signal, from a return signal in a communications system. A replica of the echo signal is produced using an adaptive filter. The replica is subtracted from the return signal. The magnitude and phase of the sinusoidal signal are determined by generating a signal that is close in frequency to the expected frequency of the sinusoid and then correlating it to the return signal. A replica of the sinusoid is produced in response to the correlation. This replica is subtracted from the return signal.

Although the terms echo canceler and echo signal are used for purposes of convenience and clarity herein, the system and method relate to canceling interfering signals other than echoes along with the interfering sinusoid.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DESCRIPTION OF PREFERRED EMBODIMENTS

Figure 1:
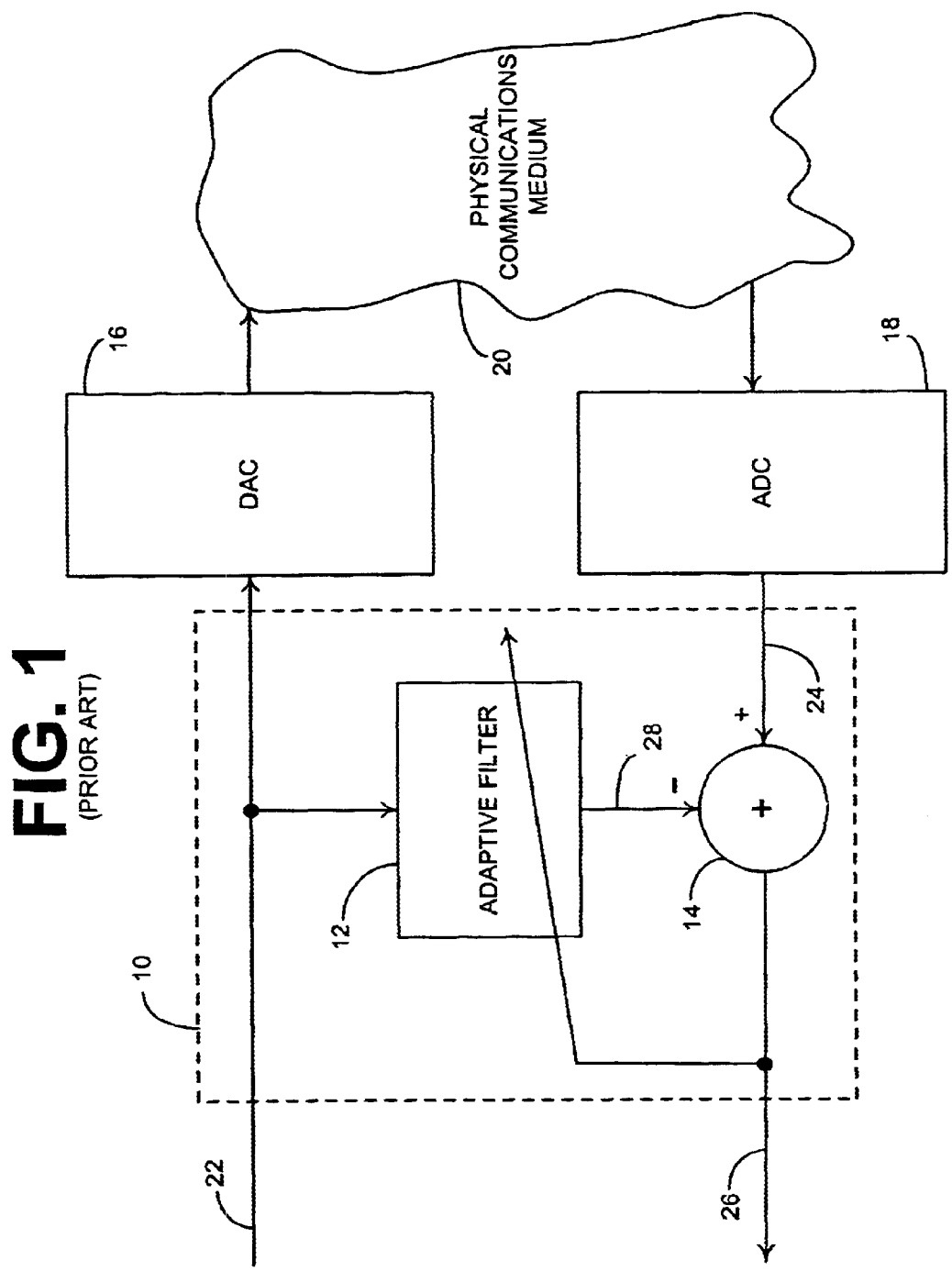
FIG. 1 is a block diagram of a prior adaptive echo canceler.

As illustrated in FIG. 1, an adaptive echo canceler 10 of the type known in the art comprises an adaptive filter 12 and a subtractor 14. Adaptive filter 12 is well-known to persons skilled in the art to which the invention pertains and is of the type commonly included in adaptive echo cancelers. As known in the art, it is a digital filter that mathematically models the echo characteristics of communications medium 20 and responds to a training sequence by converging the filter coefficients to the values that cause filter 12 to replicate the echo signal. In other words, when fully converged, filter 12 duplicates the impulse response (or, equivalently, the additive inverse of the impulse response) of the echo path. Subtractor 14 can be an adder or summing junction circuit that performs subtraction by adding the additive inverse of the subtracted input. The circuitry is digital and typically implemented in a programmable digital signal processing (DSP) chip. Echo canceler 10 is part of a communication system that includes a digital-to-analog converter (DAC) 16, an analog-to-digital converter (ADC) 18 and a communications medium 20. Communications medium 20 can be, for example, a telephone network. Echo canceler 10 and associated DAC 16 and ADC 18 may be included in, for example, a telecommunications device operated by a subscriber to the telephone service.

An outgoing signal 22 is converted to analog format by DAC 16 and transmitted via communications medium 20. The analog signal is routed through communications medium 20 and returns to the telecommunications device as a return signal 24, where ADC 18 digitizes the signal. Return signal 24 includes an echo component as a result of, for example, circuit topology or impedance mismatches. As described above, adaptive filter 12 responds to outgoing signal 22 and to the incoming signal 26 to produce an echo replica signal 28. Subtractor 14 subtracts echo replica signal 28 from return signal 24 to produce incoming signal 26. Incoming signal 26 does not have an echo component and therefore results in clearer audio in telephone and similar audio telecommunications devices or more accurately reproduced data in modems and similar digital telecommunications devices. Nevertheless, if communications medium 20 introduces a spurious sinusoidal component into return signal 24, adaptive filter 12 may be slow to converge.

Figure 2:
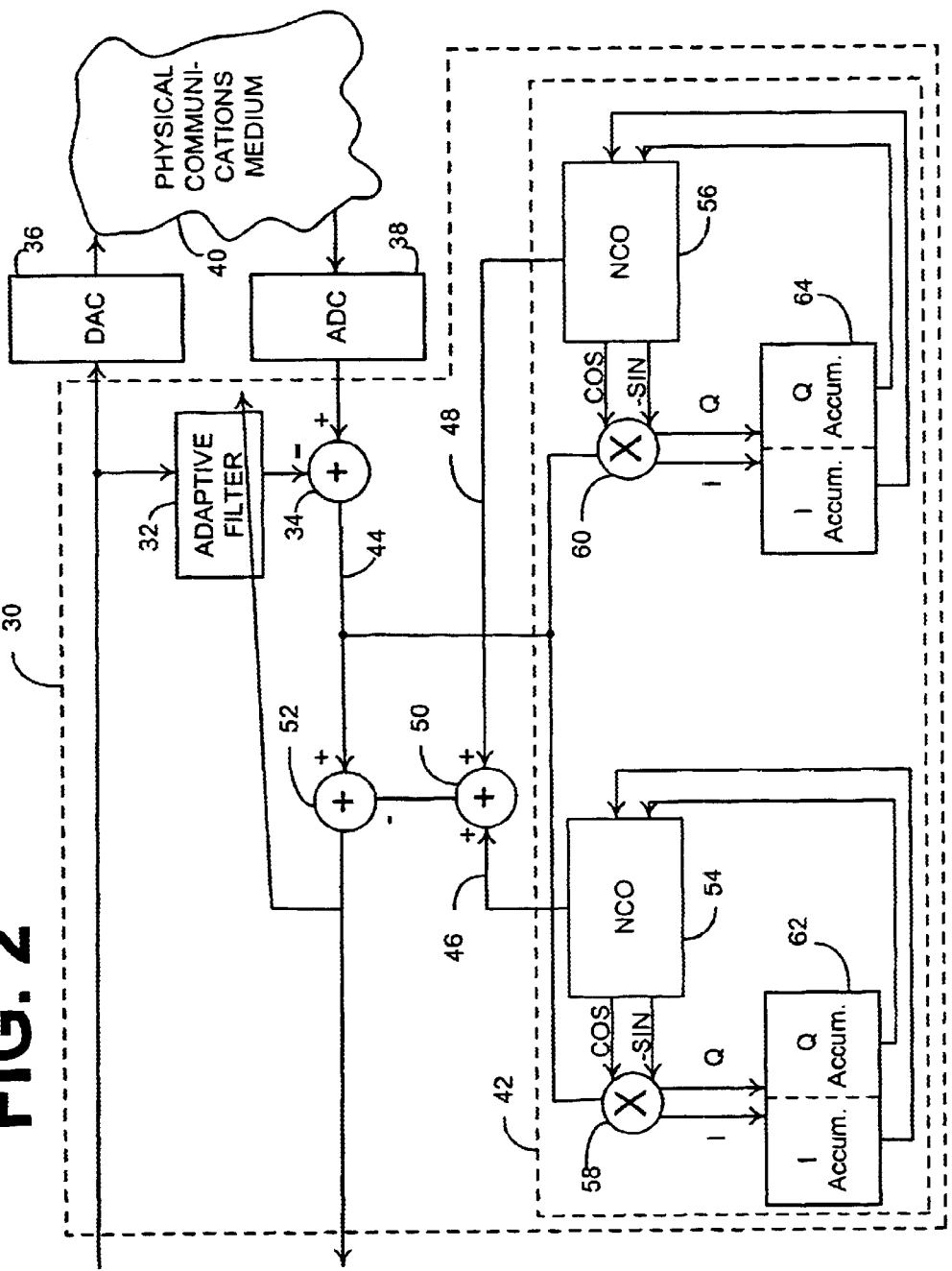
FIG. 2 is a block diagram of an echo canceler in accordance with the present invention.

In contrast to the prior system described above, the system illustrated in FIG. 2 is not adversely affected by spurious sinusoidal signals such as that of a dialtone. As illustrated in FIG. 2, an adaptive echo canceler 30 comprises an adaptive filter 32 and a subtractor 34 that can be the same as adaptive filter 12 and subtractor 14, respectively, described above. Echo canceler 30 is part of a communication system that includes a DAC 36, and ADC 38 and a communications medium 40 that can be the same as DAC 16, ADC 18 and communications medium 20, respectively, described above.

In addition to adaptive filter 12 and subtractor 34, echo canceler 30 includes a sinusoidal replica signal generator 42. Sinusoidal replica signal generator detects both the magnitude and phase of each of two sinusoidal signal components in the return signal 44. In response to detecting the magnitudes and phases, sinusoidal replica signal generator 42 produces replica signals 46 and 48 that have the detected magnitudes and phases (or signals that are the additive inverses of signal having the detected magnitudes and phases). An adder or summer 50 sums replica signals 46 and 48 to produce a replica signal that replicates the dialtone. A subtractor 52 subtracts this signal from return signal 44. As indicated above, note that whether an element is referred to as a "subtractor" or an "adder" (or "summer") does not imply a substantive difference in its structure; rather, the function of such an element depends upon the signs of the signals to be added or subtracted. Therefore, an adder (or summer) and a subtractor are considered equivalent if not identical for purposes of this patent specification.

Two sinusoidal signal components are detected, replicated and subtracted in the illustrated embodiment because this embodiment relates to canceling a dialtone, which is the sum of two sinusoidal signals. Nevertheless, other embodiments may detect, replicate and subtract only a single sinusoidal signal component or may detect, replicate and subtract more than two sinusoidal signal components. Any number of sinusoids can be canceled by including the corresponding number of NCOs, multipliers, integrators and subtractors. A dialtone is only one example of a sinusoidal signal that may be desirable to cancel. Another example is a carrier signal.

Sinusoidal replica signal generator 42 includes two numerically controlled oscillators (NCOs) 54 and 56 that each produces a quadrature output signal (i.e., a signal separated into an in-phase (I) and a quadrature (Q) component). Each of NCOs 54 and 56 is initialized upon beginning operation of the circuit to oscillate at a frequency at or near the frequency to be canceled. In an embodiment in which a dialtone is canceled, one of NCOs 54 and 56 can be initialized to a frequency of 350 Hz and the other can be initialized to a frequency of 440 Hz because a dialtone is the sum of those two frequencies.

The remainder of sinusoidal replica signal generator 42 detects the magnitude and phase of the sinusoids. It is known in the art that an integrate-and-dump circuit can be used to detect the magnitude and phase of a sinusoidal signal. A quadrature multiplier 58 multiplies the output of NCO 52 by return signal 44. Another quadrature multiplier 60 multiplies the output of NCO 54 by return signal 44. An integrate-and-dump circuit 62 integrates the output of multiplier 56. Another integrate-and-dump circuit 64 integrates the output of multiplier 58. These circuits are referred to as integrate-and-dump because they accumulate the signal over a predetermined time interval and then produce an output representing the sum or accumulation. Such a function is, in essence, integration. Nevertheless, in other embodiments of the invention other types of integration, accumulation or filtration circuits that perform an equivalent or substantially equivalent function can be used. Note that, from another perspective, each of circuits 62 and 64 provides an effect similar to a low-pass filter in that it downconverts to DC any sinusoidal component of return signal 44 that has the same frequency as the corresponding one of NCOs 54 and 56.

Each of integrate-and-dump circuits 62 and 64 provides a quadrature output signal (i.e., having both an in-phase (I) component and quadrature (Q) component) at the end of its integration interval. The output of circuit 62 is fed back to NCO 54, and the output of circuit 64 is fed back to NCO 56, to adjust the phase and magnitude of each oscillator to match those of the undesired sinusoidal components of return signal 44. As recognized by persons skilled in the art to which the invention pertains, a portion of the phase adjustment is also commonly added to the frequency control register of an NCO to allow it to correct slight frequency variations. As similarly recognized, it may also be advantageous to perform a windowing function on the outputs of multipliers 58 and 60 to minimize the effect of signals distant in frequency from the one that the corresponding one of NCOs 54 and 56 is designed to track upon its feedback data.

After a relatively brief acquisition time, the in-phase (cosine) signals emerging from NCOs 54 and 56 will have become relatively close replicas of the undesired sinusoids. Each of NCOs 54 and 56 uses the in-phase signal to produce replica signals 46 and 48, respectively, having the detected magnitude and phase of the undesired sinusoid. Each of replicas signal 46 and 48 has the form Acos((p), where A is the amplitude and (p is the phase. Each of NCOs 54 and 56 is programmed to generate its respective one of replica signals 46 and 48 in accordance with the following equations:

$$A = \sqrt{I_{dump}^2 + Q_{dump}^2}$$

$$\Phi = \angle (I_{dump}, j \cdot Q_{dump})$$

where $I_{dump}$ and $Q_{dump}$ are the accumulated in-phase and quadrature phase results, respectively, of each of integrate-and-dump circuits 62 and 64, scaled for unity gain, j is the imaginary square root of negative one. The angle symbol in the above equation is a function that yields the angle between the real axis and the complex vector between the origin and the specified point in the same angular unit used by the phase input of each of NCOs 54 and 56. Note that in this embodiment, the amplitude calculation scales only the correction signals 46 and 48 and not the output feeding the multiplier. The phase correction affects both outputs.

The feedback may be applied all at once or, alternatively, the running state of the NCO phase correction amplitude may be adjusted incrementally to converge on the correct state over time. Persons of skill in the art to which the invention pertains will recognize that, as in any kind of feedback tracking loop, the normal design tradeoffs between stability, accuracy and acquisition time apply.

Figure 3:
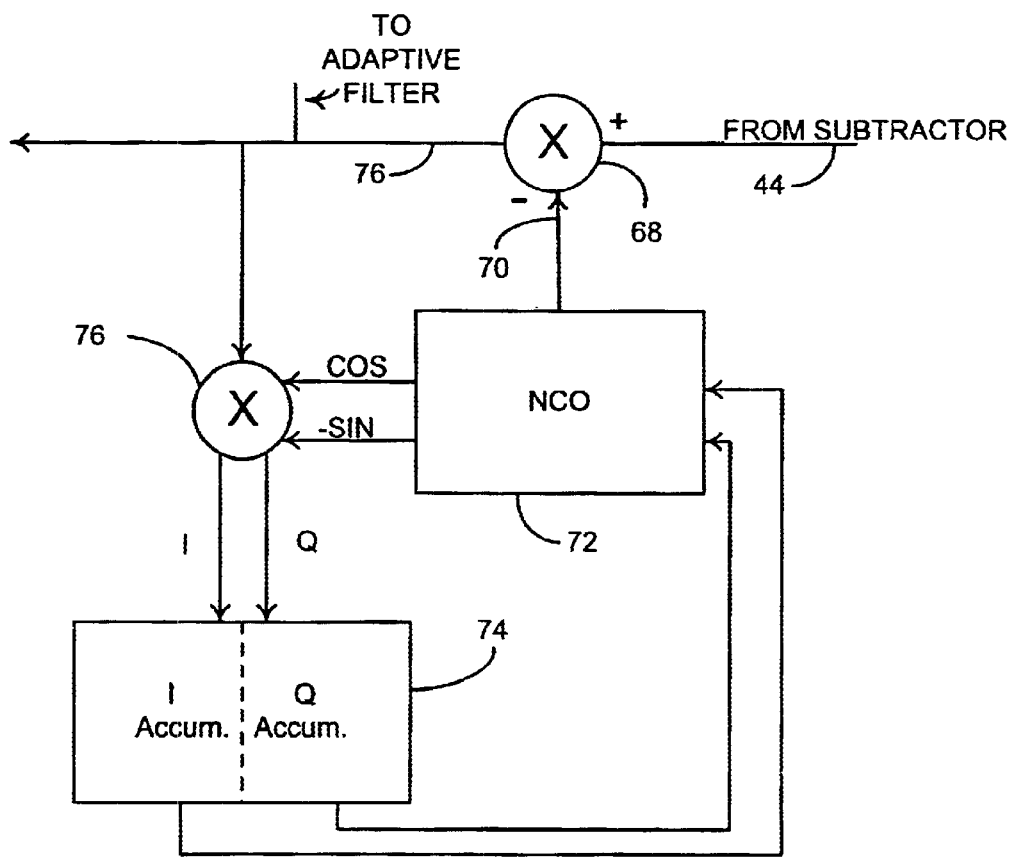
FIG. 3 is a block diagram of an alternative echo canceler.

Note that alternative topologies of the circuit described above are within the scope of the invention. For example, as illustrated in FIG. 3, in an alternative embodiment of the invention a subtractor 68 can subtract the replica signal output 70 of an NCO 72 and integrate-and-dump circuit 74 from return signal 44 before (in terms of the circuit topology) a multiplier 76 multiplies the quadrature output of NCO 72 by the corrected return signal 76. In contrast, in the above-described embodiment (FIG. 2), the subtraction occurs after the multiplication. Along with this difference in circuit topology, there is a corresponding difference in NCO programming. In the above-described embodiment, the algorithm for generating replica signals 46 and 48 is in accordance with the equations set forth above, but in this embodiment the algorithm would be in accordance with other equations. Although such other equations are not described herein, persons skilled in the art to which the invention pertains will be readily capable of deriving them.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for canceling both an echo signal and a sinusoidal signal from a return signal in a communications system in which an outgoing signal travels through a communications medium and returns as said return signal, comprising:

training an adaptive filter in response to said outgoing signal and an incoming signal to produce an echo replica signal;

subtracting said echo replica signal from said return signal;

detecting a magnitude and phase of a sinusoidal signal having a predetermined frequency present in said return signal;

producing a sinusoidal replica signal in response to said magnitude and phase of said sinusoidal signal present in said return signal; and subtracting said sinusoidal replica signal from said return signal.

2. The method claimed in claim 1, wherein:

said step of producing a sinusoidal replica signal in response to said magnitude and phase of said sinusoidal signal present in said return signal comprises controlling a numerically controlled oscillator; and said step of detecting a magnitude and phase of a sinusoidal signal having a predetermined frequency present in said return signal comprises:

multiplying an output of said numerically controlled oscillator by said return signal to produce a multiplied output; and integrating said multiplied output to produce a feedback signal controlling said numerically controlled oscillator.

3. The method claimed in claim 2, wherein said numerically controlled oscillator produces a quadrature output.

4. The method claimed in claim 1, wherein:

said detecting step comprises detecting a magnitude and phase of a first sinusoidal signal having a predetermined frequency present in said return signal and detecting a magnitude and phase of a second sinusoidal signal having a predetermined frequency present in said return signal;

said producing step comprises producing a first sinusoidal replica signal in response to said magnitude and phase of said first sinusoidal signal present in said return signal producing a second sinusoidal replica signal in response to said magnitude and phase of said second sinusoidal signal present in said return signal; and subtracting said sinusoidal replica signal from said return signal comprises subtracting said first and second sinusoidal replica signals from said return.

5. The method claimed in claim 4, wherein:

said step of producing a sinusoidal replica signal in response to said magnitude and phase of said sinusoidal signal present in said return signal comprises controlling a numerically controlled oscillator; and said step of detecting a magnitude and phase of a sinusoidal signal having a predetermined frequency present in said return signal comprises:

multiplying an output of said numerically controlled oscillator by said return signal to produce a multiplied output; and integrating said multiplied output to produce a feedback signal controlling said numerically controlled oscillator.

6. The method claimed in claim 5, wherein said numerically controlled oscillator produces a quadrature output.

7. A system for canceling both an echo signal and a sinusoidal signal from a return signal in a communications system in which an outgoing signal travels through a communications medium and returns as said return signal, comprising:

an adaptive filter producing an echo replica signal in response to said return signal and said outgoing signal;

subtraction circuitry subtracting said echo replica signal from said return signal;

a sinusoidal replica generator detecting a magnitude and phase of a sinusoidal signal having a predetermined frequency present in said return signal and producing a sinusoidal replica signal in response to said magnitude and phase of said sinusoidal signal present in said return signal; and said subtraction circuitry subtracting said sinusoidal replica signal from said return signal.

8. The system claimed in claim 7, wherein said sinusoidal replica generator comprises:

a numerically controlled oscillator;

a multiplier multiplying an output of said numerically controlled oscillator by said return signal to produce a multiplied output; and an integrate-and-dump circuit integrating said multiplied output to produce a feedback signal controlling said numerically controlled oscillator.

9. The system claimed in claim 8, wherein said numerically controlled oscillator produces a quadrature output.

10. The system claimed in claim 7, wherein:

said sinusoidal replica generator detects a magnitude and phase of a first sinusoidal signal having a predetermined frequency present in said return signal and detects a magnitude and phase of a second sinusoidal signal having a predetermined frequency present in said return signal;

said sinusoidal replica generator produces a first sinusoidal replica signal in response to said magnitude and phase of said first sinusoidal signal present in said return signal and produces a second sinusoidal replica signal in response to said magnitude and phase of said second sinusoidal signal present in said return signal; and said subtraction circuitry subtracts said first and second sinusoidal replica signals from said return signal.

11. The system claimed in claim 10, wherein said sinusoidal replica generator comprises:

a numerically controlled oscillator;

a multiplier multiplying an output of said numerically controlled oscillator by said return signal to produce a multiplied output; and an integrate-and-dump circuit integrating said multiplied output to produce a feedback signal controlling said numerically controlled oscillator.

12. The system claimed in claim 11, wherein said numerically controlled oscillator produces a quadrature output.

* * * * *